May 19, 1953  R. L. BAKER  2,638,707
REMOTE-CONTROLLED MODEL HELICOPTER
Filed July 7, 1951  2 Sheets-Sheet 1

INVENTOR.
ROBERT L. BAKER
BY Jennings & Carter
ATTORNEYS

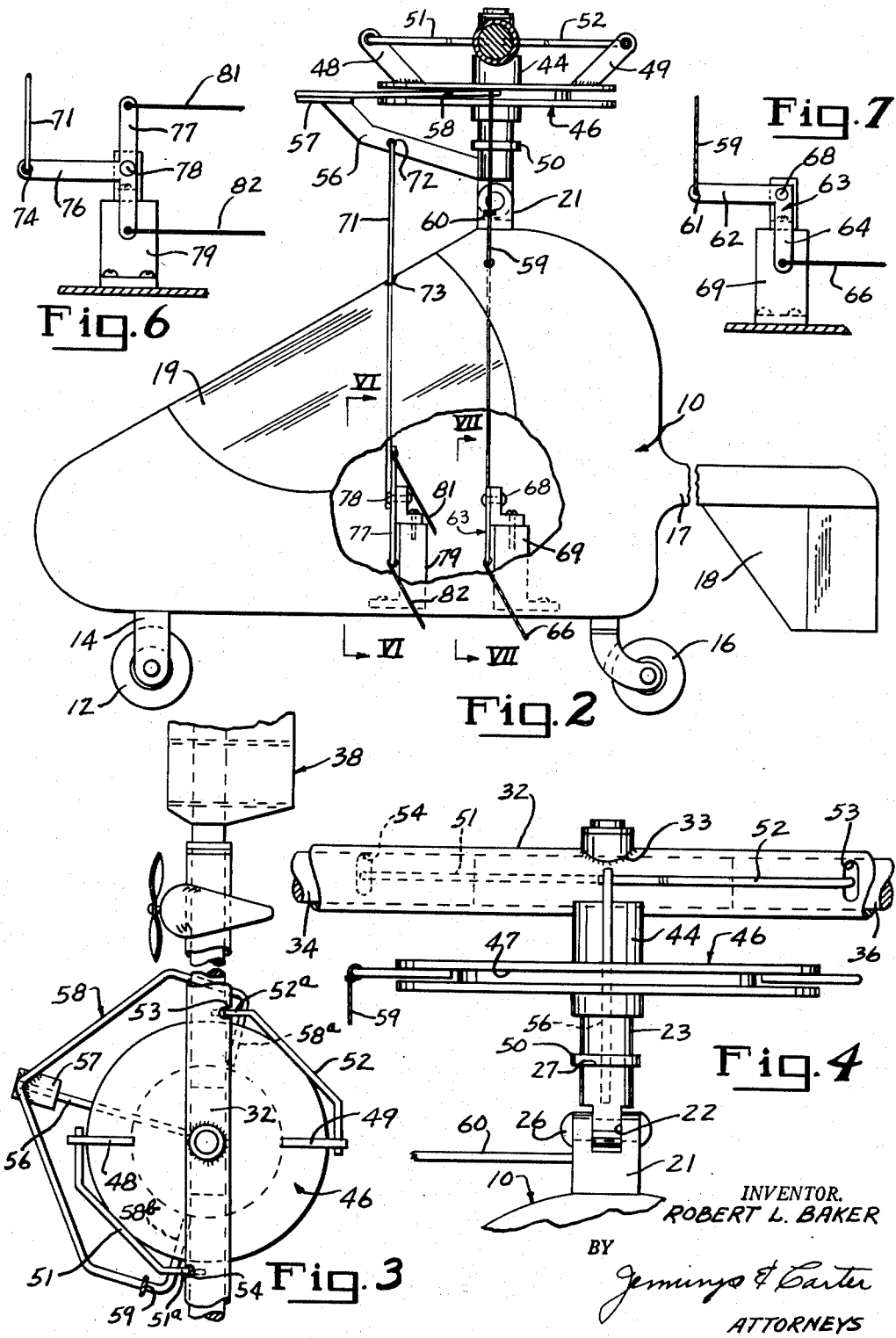

Patented May 19, 1953

2,638,707

UNITED STATES PATENT OFFICE 2,638,707

REMOTE-CONTROLLED MODEL HELICOPTER

Robert L. Baker, Cedar Bluff, Ala.

Application July 7, 1951, Serial No. 235,602

6 Claims. (Cl. 46—75)

This invention relates to model helicopters and has for an object the provision of a powered model machine which may be flown captive and which embodies controls actuated by means of control wires held in the operator's hands.

Another object is to provide a model helicopter having a rotor with adjustable lifting surfaces rotatable in the ends thereof, together with means slidable on the vertically disposed columns supporting the rotor through which the angle of attack of the lifting surfaces may be changed at the will of the operator, causing the machine to ascend or descend.

Another object is to provide a model helicopter in which the vertical column supporting the rotor assembly is rotatably mounted on the fuselage of the machine for movement in a fore and aft direction, and a wire control for the same leading to the operator, thereby affording means to cause the machine to move forward, backward, or to hover.

A further object is to provide a model helicopter of the character designated in which the rotor supporting column is pivotally secured to the fuselage at a slight angle to a vertical plane passing through the longitudinal center of the machine, said column leaning away from the side of the fuselage from which the control wires project, thus providing a built in correction to balance the weight of the control wires and to counteract in part the effect of centrifugal force when the machine is flown in a circular path.

A helicopter illustrating the features of my invention is shown in the accompanying drawings forming a part of this application in which:

Fig. 2 is an enlarged detail sectional view taken generally along line II—II of Fig. 1, some of the parts being broken away for the sake of clarity;

Fig. 3 is an enlarged detail plan view of portions of the rotor assembly, broken away and in section;

Fig. 4 is a further enlarged side elevational view of the center of the rotor and its supporting column as viewed from the rear of the helicopter;

Fig. 6 is a detailed sectional view taken generally along line VI—VI of Fig. 2; and Fig. 7 is a detail sectional view taken generally along line VII—VII of Fig. 2.

Figure 1:
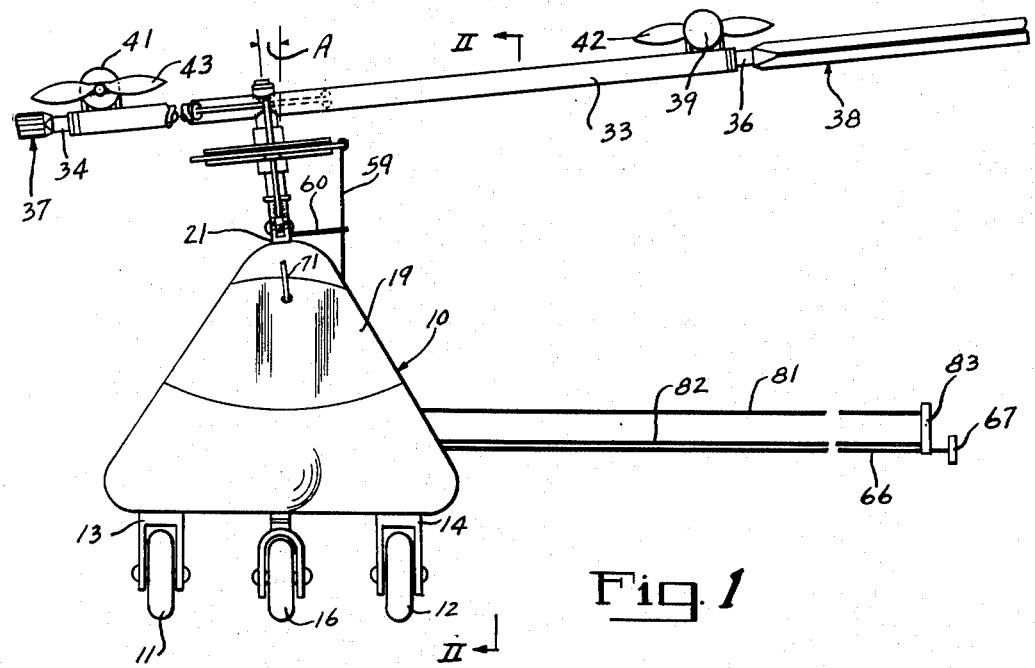
Fig. 1 is a fragmental front elevational view of my improved helicopter.
Figure 5:
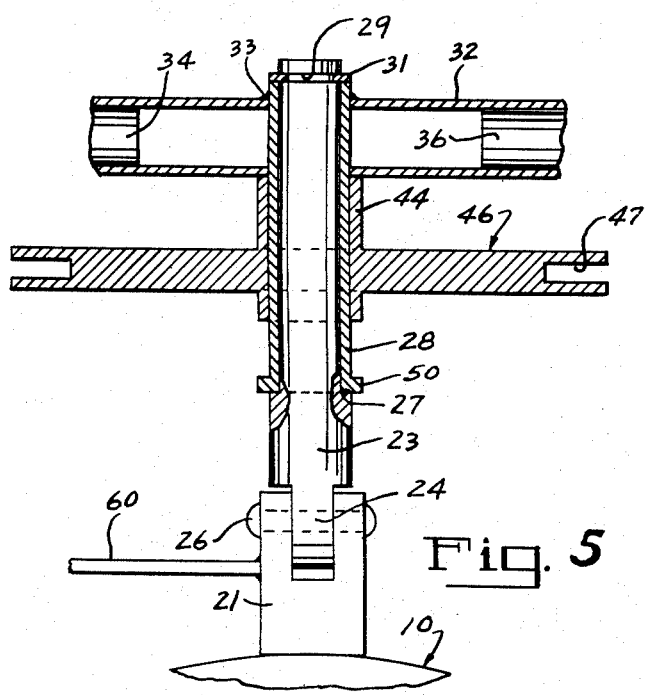
Fig. 5 is a vertical sectional view of the mechanism shown in Fig. 4.

Referring now to the drawings for a better understanding of my invention, my improved model helicopter comprises a fuselage or body indicated generally by the numeral 10. The fuselage may have a pair of front wheels 11 and 12 mounted in suitable brackets 13 and 14, respectively. At the rear the fuselage is provided with a caster type wheel 16. Projecting rearwardly of the fuselage 10 is a spar or beam 17 carrying a depending, vertical stabilizer 18. The entire fuselage and stabilizer may be made of customary material for such models, such as balsa wood and may have a transparent window 19 covering the upper forward part of the fuselage.

Rigidly secured to the top of the fuselage is a pivot member in the form of a clevis 21. The opening 22 in the clevis is aligned with the longitudinal axis of the body. As best shown in Fig. 1 of the drawings the clevis is offset to the left, the angle of offset being indicated by the letter A.

The rotor assembly supporting column 23 may be in the form of a post having a flattened end 24 adapted to fit in the clevis 21. A rivet or the like 26 holds the post 23 pivotally secure in the clevis 21. The post 23 may be shouldered adjacent its lower end as indicated at 27 to rotatably support a sleeve 28. The post may be grooved adjacent its upper end as indicated at 29 to receive a locking ring 31, thus securely holding the sleeve 28 on the post, and yet permitting the same to rotate.

The rotor assembly comprises a tubular member 32 soldered or otherwise secured as at 33 to the sleeve 28. Projecting into the ends of the tubular member 32 are the round ends 34 and 36 of the main spars of lifting airfoils 37 and 38. In the manner well understood, the airfoils are disposed with the leading edges thereof pointing in a direction to provide lift when the rotor assembly is rotated.

Power for rotating the rotor assembly may be provided by means of a pair of small internal combustion engines 39 and 41 carrying propellers 42 and 43 and mounted on the member 32. The engines are placed so that the propellers rotate the lifting surfaces 37 and 38 in a direction to pull the same through the air with the leading edges thereof moving in the proper direction.

Fitting slidably about the sleeve 28 is the elongated hub 44 of a disc 46. The disc 46 has a groove 47 in the periphery thereof. Upstanding from the top surface of the disc 46 is a pair of upwardly and outwardly directed brackets 48 and 49. Pivotally connected to the upper ends of the brackets 48 and 49 are lengths 51 and 52 of relatively stiff wire bent to the shape shown more particularly in Fig. 3. The ends 51a and 52a of the respective wires 51 and 52 project through slots 53 and 54 in the tubular member 32 and are secured rigidly in the sides of the rounded ends 34 and 36 of the spars. It will be apparent that when the disc 46 is moved vertically relative to the sleeve 28 the effect is to rotate the airfoils 37 and 38 in a direction to concomitantly increase or decrease the angle of attack thereof. A stop shoulder 50 may be provided on the lower end of the sleeve 28 to limit downward movement of the disc 46.

Secured rigidly to the lower end of the column or post 23, beneath the sleeve 28, is an outwardly and upwardly extending bracket 56. Secured to the upper end of the bracket 56 is a small horizontally disposed plate 57. Secured in any suitable manner to the plate 57 is a length of spring steel wire indicated by the numeral 58. The legs of the wire 58 are bent as illustrated in Fig. 3 and the ends 58a and 58b thereof are diametrically disposed and enter into the groove 47 of the disc 46. The spring 58 is so made that it biases the entire disc 46 upwardly so that the upper end of the hub 44 thereof contacts the underside of the tubular member 32. The wires 51 and 52 are so arranged that when the disc 46 is in its uppermost position the lifting surfaces 37 and 38 are disposed so as to permit the machine to descend.

The controls for my improved helicopter comprises a wire 59 having one of its ends secured to one portion, for instance 58b, of the spring 58. The lower end of the wire 59 is secured as at 61 to an inwardly extending arm 62 of a bell crank 63. The opposite arm 64 of the bell crank 63 is connected to a control wire 66 which leads outwardly through a suitable opening in the side of the fuselage in reach of the operator of the machine. For convenience in handling the machine the wire 66 may carry a rigid member 67 on the outer end thereof. The bell crank 63 is pivoted at 68 to a bracket 69 made fast in any suitable manner to a portion of the fuselage proper. The wire 59 may pass through an opening in a bracket 60 outstanding from the clevis 21. The object of this arrangement is to prevent the wire 59 from becoming slack when the rotor column is rocked, as will be later explained.

A push-pull rod 71 is pivotally connected at its upper end 72 to the bracket 56 and extends through a suitable opening 73 into the fuselage. As best shown in Fig. 6 the lower end of the rod is pivotally connected at 74 to an inwardly extending arm 76 formed integrally with a vertically extending arm 77. The arms 76 and 77 are pivoted at 78 to a bracket 79 mounted in suitable manner within the fuselage.

Leading from the upper end of arm 77 is a wire 81 which passes outwardly through the fuselage. Similarly, at the lower end of the arm 77 I provide a wire 82. The wires 81 and 82 may be connected by a rigid cross member 83, of a size to be held in one of the operator's hands.

From the foregoing the method of constructing and flying my improved model helicopter may now be readily described and understood. With the engines 39 and 41 in operation it will be apparent that the entire rotor assembly revolves counterclockwise as viewed in Fig. 3. In this position the airfoils 37 and 38 are capable of producing lift as soon as the angle of attack thereof is properly regulated. This is accomplished by the operator pulling outwardly on wire 66, thus pulling downwardly on wire 59, causing the disc 46 to slide downwardly. This in turn pivots the lifting surfaces through the wires 51 and 52, increasing the angle of attack and hence the amount of lift. It will be understood that the wires 81 and 82 are held taut while the machine is being flown. By increasing the angle of attack the machine rises and by proper regulation thereof the machine can be caused to hover. When it is desired to move forwardly the operator pulls on wire 82, pulling downwardly on push-pull rod 71, rocking the entire rotor assembly on the pivot 26. This has the effect of causing the lifting surfaces to exert a forward component of force, making the machine move forwardly. If it is desired to move backwardly the operator manipulates the hand piece 83 in such manner as to push upwardly on push-pull rod 71, causing the machine to move bodily in a rearward direction. Thus, the controls shown afford means for causing the machine to move forwardly or backwardly, or, at the will of the operator, simply to hover over a given spot.

From the foregoing it will be apparent that I have devised an improved model helicopter which is practical in every respect. It will be understood that the wires 81 and 82 serve both as control wires for fore and aft movement of the machine and as flying wires for holding the machine captive. The offset of the entire rotor assembly illustrated by the angle A is helpful in counterbalancing the weight of the wires 66, 81 and 82 so that the fuselage of the machine tends to remain substantially horizontal when the model is flown in a circular path. By spring biasing the disc 46 upwardly so that the lifting surfaces 37 and 38 are automatically biased to produce a little less lift than required to sustain the machine, I eliminate the necessity of two wires 66 and am able to use a flexible wire 59 instead of a push pull rod similar to 71 for changing the angle of attack of the lifting surfaces.

While I have shown my invention in but one form, it will be obvious to those skilled in the art that it is not so limited but is susceptible of various changes and modifications without departing from the spirit thereof and I desire therefore that only such limitations shall be placed thereupon as are specifically set forth in the appended claims.

What I claim is:

1. In a model helicopter, a fuselage, a pivot member rigidly secured to and projecting above the fuselage, a rotor supporting column pivotally connected to said pivot member, a rotor assembly embodying a center section pivotally mounted on the column, angularly adjustable lifting airfoils in the ends of the center section, a member surrounding the column and slidable vertically relative to the rotor assembly, means operatively connecting the member to said airfoils effective upon movement of the member relative to the column to vary the angle of attack of said airfoils, remote control means for moving said member in a direction to increase the angle of attack of said airfoils, remote control means operatively connected to the column for tilting the same in fore and aft directions, and means to rotate the rotor assembly.

2. In a model helicopter embodying a fuselage, the improvements comprising a pivot member rigidly secured to and projecting above the fuselage, a rotor supporting column pivotally secured adjacent its lower end to said pivot member, means limiting the pivotal movement of the column substantially to fore and aft directions, a rotor assembly mounted for rotation on the column, angularly adjustable lifting airfoils in the rotor, a member slidably mounted about the column operatively connected to said airfoils for concomitantly changing the angle of attack thereof in response to sliding movement of said member, means to drive the rotor, remote control means operatively connected to the column for tilting the same in fore and aft directions, and other remote control means operatively connected to said slidable member effective to move the same along the column.

3. A helicopter as defined in claim 2 in which the remote control means for tilting the rotor column and sliding said member comprises flexible members adapted to be held in an operator's hands.

4. A helicopter as defined in claim 2 in which the slidable member is spring biased upwardly on the column, and in which the angle of attack of the lifting airfoils is less when said member is in upper position than when the same is moved downwardly of the column.

5. In a model helicopter embodying a fuselage, a rotor embodying lifting airfoils pivotally mounted thereon and remote control means operatively connected to said airfoils for rotating the same to change the angle of attack, the improvements comprising a rotor supporting column, a pivot member fixed to an upper part of the fuselage and extending outwardly thereof, means securing the lower end of the column to the pivot member and limiting the pivotal movement thereof to fore and aft direction relative to the fuselage, remote control means operatively connected to said column for rocking the same about the pivot member, and power means for driving the rotor.

6. A model helicopter as defined in claim 5 in which the means to rock the column comprises a push-pull member operatively connected at its upper end to the column above the point of connection therewith to said pivot member, a crank pivoted to the fuselage to which the lower end of said push-pull member is in turn connected, and a pair of flexible members connected to said crank for pivoting it in opposite directions and extending outwardly of the fuselage in reach of the operator of the helicopter.

ROBERT L. BAKER.

References Cited in the file of this patent

UNITED STATES PATENTS

| Number | Name | Date |
| --- | --- | --- |
| 1,973,592 | Weisinger | Sept. 11, 1934 |
| 2,163,728 | Dyer et al. | June 27, 1939 |
| 2,178,014 | Brown | Oct. 31, 1939 |
| 2,308,916 | Halligan et al. | Jan. 19, 1943 |
| 2,429,502 | Young | Oct. 21, 1947 |
| 2,468,913 | Avery | May 3, 1949 |

FOREIGN PATENTS

| Number | Country | Date |
| --- | --- | --- |
| 930,727 | France | Aug. 25, 1947 |